Oct. 14, 1958   J. P. ESTABROOK   2,856,426
THERMAL DECOMPOSITION OF ACETIC ACID
Filed Jan. 12, 1955
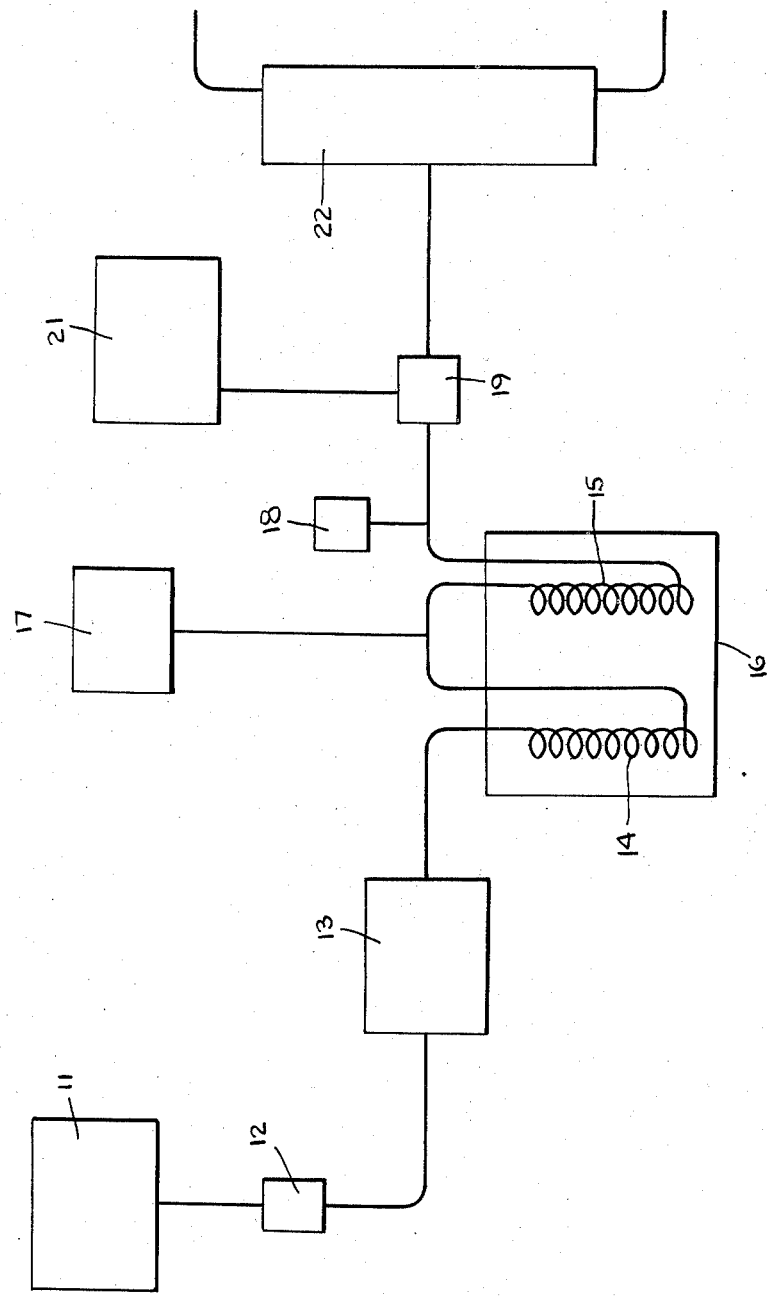
INVENTOR.
J. P. Estabrook
BY
ATTORNEYS

United States Patent Office 2,856,426
Patented Oct. 14, 1958

2,856,426

THERMAL DECOMPOSITION OF ACETIC ACID

James P. Estabrook, Drummondville, Quebec, Canada, assignor to Canadian Celanese Ltd., Montreal, Quebec, Canada, a corporation of Canada Application January 12, 1955, Serial No. 481,444

8 Claims. (Cl. 260—547)

This invention relates to the thermal decomposition of acetic acid and relates more particularly to an improved process for the thermal decomposition of acetic acid to produce acetic anhydride.

Acetic anhydride and ketene may be readily produced by heating acetic acid vapor to high temperatures, usually 500° to 800° C., in the presence of an appropriate dehydration catalyst. The process is best carried out in a reaction vessel constructed of or lined with a stainless steel alloy containing nickel and chromium. Such an alloy provides both mechanical strength and corrosion resistance at the high temperatures involved and, in addition, may assist the thermal dehydration of the acetic acid to acetic anhydride.

The dehydration reaction is accompanied by wasteful secondary reactions wherein some of the product breaks down to form carbon and decomposition gases which represent a direct raw material loss. In addition, the carbon deposits in the reaction tube and accumulates to the extent that it blocks the tube and necessitates a process shutdown for cleaning, while the decomposition gases increase considerably the auxiliary equipment needed for cooling the products of the process.

It is an important object of this invention to provide a process for the thermal decomposition of acetic acid which will be free from the foregoing and other difficulties.

A further object of this invention is to provide an improved process for the thermal decomposition of acetic acid in which there will be a minimum of undesirable secondary reactions.

Other objects of this invention will be apparent from the following detailed description and claims.

According to the present invention, the thermal decomposition of acetic acid is carried out in the presence of a catalyst comprising a compound of phosphorus and sulfur to which compound are linked alkyl groups. The said catalyst compound preferably also contains oxygen in the molecule. Advantageously, the decomposition is carried out in a heated reaction vessel constructed of or lined with a stainless steel alloy containing nickel and chromium. After passing through the reaction vessel, the vapors are treated to recover the valuable products contained therein from the water that has formed during the decomposition reaction. These products, as is well known in the art, include ketene and acetic anhydride mixed with unreacted acetic acid, and may be recovered as such or as a mixture of acetic anhydride and acetic acid by permitting the ketene to react with the acetic acid.

The catalyst compound of this invention functions not only as a dehydration catalyst, but also as an inhibitor of the wasteful secondary reactions producing decomposition gases and carbon. The great value of the invention will be obvious from the fact that both these functions are performed in an exceedingly efficient manner with the added advantage that only one compound need be introduced into the acetic acid vapor being decomposed. Examples of suitable catalyst compounds are the alkyl esters of sulfur-substituted phosphoric acids including the lower alkyl esters of thionophosphoric or of thiophosphoric acid such as the methyl, ethyl, propyl, butyl or amyl esters of thionophosphoric acid or thiophosphoric acid. Mixed esters may also be used. The esters have the formula

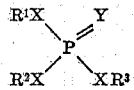

in which $R^1$, $R^2$ and $R^3$ are the same or different lower alkyl groups, as specified above, Y is oxygen or sulfur and X is oxygen or sulfur, at least one X or Y being sulfur. Examples of such compounds are diethyl S-methyl thiophosphate and diethyl S-ethyl thionophosphate. A compound which has been found to be particularly desirable for the process of this invention is triethyl thionophosphate.

It is preferred to employ the catalyst compound in an amount equal to between 0.03 and 0.5 percent, based on the weight of the acetic acid supplied to the reaction zone. However, even smaller quantities of, for instance, 0.02 percent, based on the weight of the acetic acid, have a noticeable effect in catalyzing the thermal decomposition of the acetic acid and in suppressing secondary reactions. Larger quantities than 0.5 percent, based on the weight of the acetic acid used may be employed, e. g. 1 or 2 percent, although generally such larger quantities are unnecessary.

In carrying out the reaction, the acetic acid may be first vaporized and preheated before being passed into the strongly heated reaction zone where the thermal decomposition takes place. The catalyst compound can be introduced into the reaction zone by addition to the acetic acid while the said acid is in the liquid state. It is usually more convenient, however, to inject a separate feed, comprising a solution of the catalyst in a small amount of acetic acid, into the preheated acetic acid vapors before they enter the reaction zone. After passing through the reaction zone, the products of the reaction are cooled and may have mixed therewith a substance capable of entraining the water that is formed during the reaction whereby the said water is prevented from reacting with the ketene and acetic anhydride in said products. As is well known into the art, substances suitable for the purpose include benzene, toluene, chloroform, ethylene dichloride and the like.

It is also desirable to have present in the products of the reaction a sufficient quantity of ammonia, a nitrogenous base, or other basic material in an amount sufficient to neutralize the catalyst so as to prevent or minimize the reaction between the water and the ketene and acetic anhydride present in the products. Such basic material may be added to the products of reaction after they leave the reaction zone. Alternatively, they may be introduced into the acetic acid together with the catalyst, for example, as the ammonium or other salt of such catalyst. The presence of such basic material in the reaction zone will not interfere with the thermal decomposition of the acetic acid, yet will effectively prevent the recombination of the water of reaction with the products of the decomposition once said products have been cooled.

An apparatus suitable for carrying out the process of this invention is shown in the accompanying drawing.

Referring now to the drawing, the reference numeral 11 designates a feed tank from which a stream of acetic acid is passed through a flowmeter 12 into a vaporizer 13 wherein the liquid acetic acid is converted to the vapor state. The acetic acid vapors then pass into a preheater coil 14 and from said preheater coil into a reactor coil 15, both contained in a furnace 16. As the acetic acid vapors pass from the preheater coil 14 into the reactor coil 15, there is introduced into the said vapors from the feed tank 17 a solution in acetic acid of the dehydration catalyst, which solution vaporizes rapidly. As the vapors leave the reactor coil 15, there is introduced into the same a small amount of ammonia or other nitrogenous base from a feed tank 18. The vapors then pass into a quenching vessel 19 into which there is introduced from a feed tank 21 a liquid entraining agent that sharply reduces the temperature of the vapors. After leaving the quenching vessel 19, the vapors enter a still 22 where the entrainer, water of reaction and any decomposition gas pass overhead and from the base of which the desired products are removed.

The following examples are given to illustrate this invention further.

*Example I*

A reaction tube is constructed of high silica glass containing approximately 96.0 percent silicon dioxide and 3.0 percent boron oxide, having a length of 20 inches and an internal diameter of 1.0 inch. A triangular bundle of three strips of stainless steel, each strip being 8 inches long, half an inch wide, and 1/16 inch in thickness is located inside the tube at the mid-point. The stainless steel contains approximately 19.0 percent chromium, 12.0 percent nickel, 3.5 percent molybdenum, and the balance iron. The reaction tube is heated to approximately 710° C. and the combned vapors of acetic acid and 0.2 percent of triethyl thionophosphate, based on the weight of the acetic acid, are passed through the tube at a rate of approximately 0.04 lb. per hour of the combined vapors. The products are passed through a condenser which removes the anhydride, unchanged acid, and water while the decomposition gas passes through and is measured before being discharged as waste. After a run of 1 hour duration, it is found that the evolution of decomposition gas is 1.92 percent by weight based on the acid feed, that the product strength is 26 percent by weight of acetic anhydride and that there is a slight trace of carbon on the stainless steel.

A run under the same conditions but without the addition of triethyl thionophosphate to the acid gives an evolution of decomposition gas of 12.80 percent by weight based on the acid feed, a product strength of 15 percent acetic anhydride and a pronounced coating of carbon on the stainless steel.

*Example II*

The same reaction tube as described in Example I, with new stainless steel strips of the same composition, size, and arrangement is heated to approximately 750° C. and the combined vapors of acetic acid and 0.05 percent of triethyl thionophosphate, based on the weight of acetic acid, are passed through the tube at a rate of approximately 0.04 lb. per hour of the combined vapors. The products are passed through a condenser and the decomposition gas measured as in Example I. After a run of 2 hours' duration, it is found that the evolution of decomposition gas is 7.10 percent by weight based on the acid feed, the product strength is 22 percent by weight of acetic anhydride, and the carbon decomposition on the stainless steel is slight.

A run under the same conditions for 2 hours, but without the addition of triethyl thionophosphate to the acid, gives an evolution of decomposition gas of 22.4 percent by weight based on the acid feed, a product strength of 19.4 percent acetic anhydride, and a pronounced coating of carbon on the stainless steel.

It is to be understood that the foregoing detailed description is merely given by way of illustration and that many variations may be made therein without departing from the spirit of my invention.

Having described my invention, what I desire to secure by Letters Patent is:

1. Process for the thermal decomposition of acetic acid to produce a member of the group consisting of acetic anhydride and ketene, which comprises carrying out the thermal decomposition in the presence of a lower alkyl ester of a sulfur substituted phosphoric acid.

2. Process for the thermal decomposition of acetic acid to produce a member of the group consisting of acetic anhydride and ketene, which comprises carrying out the thermal decomposition in the presence of between about 0.03 and 0.5 percent by weight of a lower alkyl ester of a sulfur substituted phosphoric acid.

3. Process for the thermal decomposition of acetic acid to produce a member of the group consisting of acetic anhydride and ketene, which comprises carrying out the thermal decomposition in the presence of a lower alkyl ester of a sulfur substituted phosphoric acid in a reaction vessel of a stainless steel alloy containing nickel and chromium.

4. Process for the thermal decomposition of acetic acid to produce a member of the group consisting of acetic anhydride and ketene, which comprises carrying out the thermal decomposition in the presence of between about 0.03 and 0.5 percent by weight of a lower alkyl ester of a sulfur substituted phosphoric acid in a reaction vessel of a stainless steel alloy containing nickel and chromium.

5. Process for the thermal decomposition of acetic acid to produce a member of the group consisting of acetic anhydride and ketene, which comprises carrying out the thermal decomposition in the presence of a lower alkyl ester of thiophosphoric acid.

6. Process for the thermal decomposition of acetic acid to produce a member of the group consisting of acetic anhydride and ketene, which comprises carrying out the thermal decomposition in the presence of a lower alkyl ester of thionophosphoric acid.

7. Process for the thermal decomposition of acetic acid to produce a member of the group consisting of acetic anhydride and ketene, which comprises carrying out the thermal decomposition in the presence of a compound of the formula

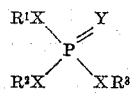

where $R^1$, $R^2$ and $R^3$ are lower alkyl groups, and X and Y are divalent radicals selected from the group consisting of oxygen and sulfur, at least one of said divalent radicals being sulfur.

8. Process for the thermal decomposition of acetic acid to produce a member of the group consisting of acetic anhydride and ketene, which comprises carrying out the thermal decomposition in the presence of triethyl thionophosphate.

References Cited in the file of this patent

UNITED STATES PATENTS

| | | |
|---|---|---|
| 1,878,953 | Meingast et al. | Sept. 20, 1932 |
| 1,946,707 | Meingast et al. | Feb. 13, 1934 |
| 1,982,154 | Dierichs et al. | Nov. 27, 1934 |

OTHER REFERENCES

Goddard: A Textbook of Inorganic Chemistry, vol. XI, part III, pp. 6 and 76 (1936), Chas. Griffin & Co. Ltd., London.